Sept. 19, 1950  E. B. HEDGPETH  2,523,210
DOLLY COUPLER FOR AUTOMOTIVE VEHICLES
Filed April 29, 1946
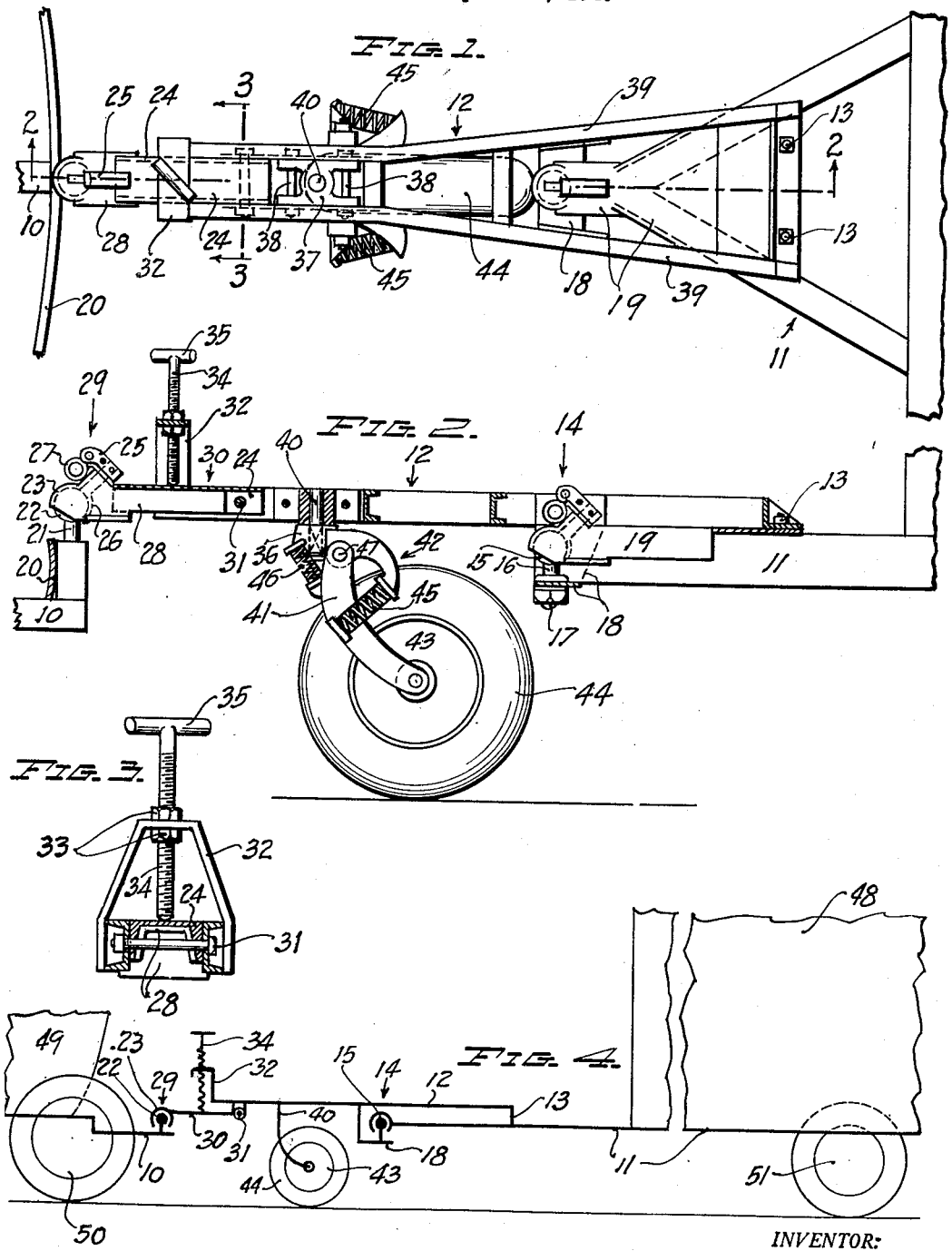
INVENTOR:
EDWARD B. HEDGPETH,
BY
ATTORNEYS.

Patented Sept. 19, 1950

2,523,210

UNITED STATES PATENT OFFICE 2,523,210

DOLLY COUPLER FOR AUTOMOTIVE VEHICLES

Edward B. Hedgpeth, Salt Lake City, Utah

Application April 29, 1946, Serial No. 665,774

9 Claims. (Cl. 280—33.44)

This invention relates to a dolly coupler for automotive vehicles, and more particularly to such a coupler that connects an automobile to a house trailer although not necessarily so restricted.

Among the principal objects of the invention are to provide:

(a) Means whereby an assembly of automotive unit, coupler and trailer is under complete control of an operator when backing the automotive unit.

(b) Means whereby backing is conveniently accomplished by even an unskilled operator.

(c) A dolly coupler having a caster wheel that is easily and quickly attached to or detached from both an automotive unit and a trailer unit.

(d) A dolly coupler by means of which the weight of the trailer at the tongue thereof is divided between the automotive unit and the coupler caster wheel in practically any proportions desired.

(e) A dolly coupler having selective adjusting means whereby, under normal and favorable running conditions, substantially the entire trailer tongue weight is carried by the dolly, thus relieving the automotive unit and especially the tires thereof, from undue wear.

(f) A dolly coupler wherein the selective adjusting means is effective to cause any desired proportion of the trailer tongue weight to be added to the traction wheels of the automotive unit at times when the road or running conditions demand it.

Other objects will become apparent as the description proceeds.

According to the invention the dolly coupler forms an extension to the tongue of a trailer in order to provide a favorable location for supporting the weight at the tongue of the trailer on a pilot or caster wheel that automatically accommodates itself to the varying directional movements between an automotive vehicle and the trailer. Mounted at a suitable point on the extension rig is a rocker arm comprising a lever of the second order, the forward end of which is connected to the chassis of an automotive vehicle, and the fulcrum of which is located immediately in advance of the caster wheel, this connection having considerable flexibility.

The rocker arm swings in a vertical plane and is held in various selective positions at the option of the operator in accordance with any particular running demands. Thus, if running conditions are favorable and the normal tractive effort of the driving wheels is sufficient to pull the trailer, the rocker arm is so adjusted that little or none of the weight of the trailer is carried by the driving wheels, but if conditions are such that additional traction must be supplied to the driving wheels, then this additional requirement will be selectively supplied by adjusting the rocker arm, accordingly.

Compared with the advantages secured by means of the invention, backing an automobile with a house trailer conventionally coupled thereto is ordinarily a hazardous procedure even for a skilled driver or operator, largely so because of the inflexibility of the usual coupling devices. Usual devices also are subject to unfavorable running results because the proportion of the trailer weight that is carried by the automobile wheels is necessarily fixed and represents a compromise between an upper and lower limit that is designed to meet average running conditions. Such a usual compromise at best is unsatisfactory, because, under favorable running conditions, too much weight is imposed upon the automotive driving wheels, while under unfavorable running conditions, such as wet or slippery road surfaces, not enough weight bears on the driving wheels to insure the necessary tractive effort.

Among advantages secured by means of the invention, a very important one is that the proportion of the trailer weight imposed upon the automotive driving wheels is selectively varied according to variations in the running conditions.

In the accompanying drawing which illustrates one embodiment of the invention:

Fig. 1 represents a plan of the dolly coupler and fragmentary portions of an automotive unit and a trailer with which the dolly coupler is associated;

Fig. 2, a side elevation corresponding to Fig. 1, largely in vertical section taken on the line 2—2 in Fig. 1;

Fig. 3, a vertical section taken on the line 3—3 in Fig. 1, drawn to an enlarged scale, some parts in the background being omitted for convenience; and, Fig. 4, a side elevation line diagram setting forth the assembled relation between an automotive unit, a dolly coupler and a trailer unit.

Referring to the drawing, the numeral 10 denotes a support that is fixed at the rear of an automotive vehicle chassis (not shown) and 11 the tongue of a house trailer. At 12 is a coupling frame one end of which rests on the tongue 11 so as to be rigidly secured thereto for convenient attachment or detachment by any suitable means, such as bolts 13. Furthermore, there is a quickly manipulative ball and socket connection that completes the attachment of the frame 12 to the tongue 11. The ball element 15 is carried on a stem 16 that in turn is fastened, by means of a nut 17, in a bracket 18 depending from the frame 12. The ball and socket feature in this particular fastening does not function as a universal joint, but is here used because it forms part of a device that is purchasable in the open market, and forms a very advantageous quick connection. This device has a V-type angle iron 19 that is welded or otherwise fastened to the tongue.

Mounted on the support 10 in proximity to the bumper 20 of the automotive vehicle is a stem 21, in this instance similar to the stem 16. The stem 21 carries a ball 22 similar to the ball 15, and at 23 is a socket element that removably engages the ball 22. The socket element 23 forms an integral part of a straight channel iron 28 and has mounted on it a double-hinged release lever 25 that is connected to a latch 26, the latter engaging the ball 22 in the coupling operation. The release lever 25 is manipulated manually by means of a finger grip 27. It is convenient to refer to the parts 21 to 27 collectively as a coupling connection 29.

In this instance the coupling connection 29, by means of the channel iron 28, is advantageously welded to a structural channel 24 so the assemblage constitutes a vertically oscillating rocker arm 30 pivotally mounted at 31 in the frame 12. Fixed on the frame 12 is a standard 32, which in this instance is of inverted U-shape and straddles an adjusting screw 34 that is threaded in the bend of the U. The adjusting screw 34 conveniently terminates in a T-handle 35 and is operative to limit the extent of oscillation of the rocker arm 30.

It is to be noted that as a matter of present convenience the ball and socket details of the coupling connections 14 and 29 are similar to each other, with the difference however, that in its functioning the ball and socket feature of coupling connection 29 makes full use of the universal directive property, while in the case of the coupling connection 14, the ball and socket feature functions merely as a convenient and expeditious coupling means. It is also to be noted that the coupling connections 14 and 29 form the subjects of U. S. Patents Nos. 2,090,113, 2,166,208, and 2,178,094, and per se constitute no part of the present invention. Any other usual or suitable coupler may be used.

At a convenient point, advantageously about midway between the coupling connections 14 and 29, is a distance piece 37 that is fastened, for example by means of bolts 38, between the respective side members 39 of the frame 12. In the piece 37 is held, in fixed, depending fashion, a stem 40 forming a bearing pin for a head 36 to which is pivoted at 47, a swiveling fork 41 that in turn constitutes a part of a caster assembly 42. This assembly includes, further, a wheel 43 having a tire 44, while the fork 41 has the springs 45 that take up the road impacts when the wheel 43 is rolling forward, and springs 46 that take up any backing impact. Thus, the caster assembly has a limited degree of spring controlled oscillation in a vertical plane around the pivotal connection 47.

The caster wheel assemblage 42 per se forms no part of the present invention, it being employed merely as a matter of convenience, since it gives good service and may be bought in the open market. Any other serviceable caster wheel may be used so long as it fulfills the operative requirements.

In operation, the frame or rig 12 and the rocker arm 30, with its coupling connection 29, constitute an extension of the tongue of, for example, a house trailer 48, Fig. 4. Considered along a horizontal plane the tongue extension is rigid. The only point of articulation between the house trailer 48 and an automotive unit 49 is at the ball and socket 22—23 of the connection 29, forming a universal joint, this particular consideration being essentially not different from what is well known, with the exception that in the case of the invention, there is advantageously more space between the automotive unit and the house trailer. This greater spacing amplifies the utility of the caster wheel, and greatly enhances the maneuverability of the assemblage.

Considered along a vertical plane, the tongue extension of the house trailer 48 is rigid only to and as far as the pivotal point 31. Thus, vertically, there are two points of articulation when the device is installed for operation, one, the aforementioned ball and socket 22—23, the other, the pivot 31. Between these two points sufficient articulative flexibility is provided so that practically any desired degree of tongue-weight distribution upon the driving or traction wheels 50 of the automotive unit and upon the caster assembly 42, between maximum and minimum, either way, is made selectively possible. In the present instance, selective distribution of the tongue-weight is accomplished by means of the screw 34.

In the exemplary case indicated in Fig. 4, the tongue-weight of the house trailer 48 is resting almost altogether on the caster wheel 43, only a modicum of the tongue-weight being allowed to bear through the chassis connection 10 on the traction wheels 50. Now, if a greater tractive effort is desired, the screw 34, by means of handle 35, is turned in the proper direction to tend to force the rocker arm 30 downwardly, thereby causing a mutual reaction between the arm 30 and the frame 12 around the ball 22 as a fulcrum, whereby more and more of the tongue-weight is imposed upon traction wheels 50, until ultimately, if desired, the entire tongue-weight can be made to rest thereon.

By turning the screw 34 in the opposite direction, less and less of the tongue-weight is imposed on the traction wheels, until finally the weight so imposed is reduced to zero, thus leaving the entire tongue-weight to be borne by the caster wheel.

Obviously, the matter of tongue-weight distribution between the traction wheels 50 and the caster wheel 43 is entirely one of selectivity on the part of the operator. House trailers as a rule are so constructed that approximately one-eighth of the weight thereof bears on the coupling connection at the automotive unit, while seven-eighths of the weight is carried by the supporting wheels of the house trailer. In this instance, the supporting wheels are indicated at 51. In other words, the tongue-weight of a house trailer, as the term is herein used, is substantially one-eighth the weight of the trailer.

By the term "tongue weight" is to be understood the weight at the outboard point where the tongue is supported. In this instance, the outboard point at one time is on the ball 22 and at another time on the vertical center line of the caster wheel 43, depending on the adjustment effected by the screw 34.

While specific details of construction are necessarily shown and described herein by way of illustration, the invention is limited only by the terms of the following claims.

What is claimed is:

1. A coupling device operative to flexibly connect an automotive unit to a trailer unit, including in combination an extension rig adapted to be rigidly but detachably connected to the tongue of said trailer unit; rocker means oscillatingly connected to said extension rig; universal joint means adapted to connect said rocker means to said automotive unit; a caster support under said extension rig; and weight compensating means operatively positioned between said extension rig and said rocker means.

2. An assemblage including an automotive unit; a trailer unit spaced apart rearwardly from said automotive unit; frame means rigidly but detachably connected to the tongue of said trailer unit; vertically adjustable rocker means connected to said frame means; universal joint means detachably connecting the said rocker means to said untomotive unit; caster wheel means having oscillative motion around a vertical axis; and holding means effective to fix said vertical axis in said frame between the automotive unit and the trailer unit.

3. A coupling device operative to flexibly connect an automotive unit to a trailer unit, including in combination an extension rig adapted to be rigidly but detachably connected to the tongue of said trailer unit, said extension rig comprising a frame having a tongue connection means at its rearward end and a second tongue connection means intermediate its length; a rocker element pivotally connected to said frame adjacent but rearwardly of the forward end thereof for oscillation in a vertical plane, said rocker element extending forwardly of said frame; a universal joint connection disposed at the forward end of said rocker element and adapted for connection to an automotive unit; caster supporting means secured to and depending from said frame between said second tongue connection and the said pivotal connection to the frame of said rocker element; and weight compensating means operatively positioned between said frame and said rocker element forwardly of said pivotal connection between the two.

4. The combination recited in claim 3, wherein the frame comprises side members which converge from the rear forwardly, being spaced apart uniformly for a distance at their forward ends to receive and pivot the rocker element for vertical oscillatory movement therebtween.

5. The combination recited in claim 4, wherein the weight compensating means comprise a bridge element rigidly secured to the forward ends of the frame side members and extending across the rocker element forwardly of its pivot axis, and, further, a weight adjusting screw threaded in said bridge element for operation against the rocker element.

6. The combination recited in claim 5, wherein the caster supporting means comprise a caster wheel mounted between the frame side members rearwardly of the rocker element.

7. The combination recited in claim 3, wherein the rocker element is pivoted between two spaced frame members, for oscillatory movement therebetween in a vertical plane, and wherein the weight compensating means comprise a bridge element rigidly secured to the said frame members and extending across the rocker element forwardly of its pivot axis, and a weight adjusting screw threaded in said bridge element for operation against the rocker element.

8. The combination recited in claim 1, wherein the rocker means is pivoted to the extension rig between two spaced members thereof for oscillatory movement therebteween in a vertical plane, and wherein the weight compensating means comprise a bridge element rigidly secured to the said spaced members and extending across the rocker element forwardly of its pivot axis, and a weight adjusting screw threaded in said bridge element for operation against the rocker means.

9. The combination recited in claim 2, wherein the rocker means is pivoted between spaced members of the frame means for oscillation in a vertical plane, and an adjustment screw carried by a member secured to said spaced members and bridging the said rocker means is arranged to operate against said rocker means for effecting the vertical adjustment thereof.

EDWARD B. HEDGPETH.

REFERENCES CITED

The following references are of record in the file of this patent:

UNITED STATES PATENTS

| Number | Name | Date |
| --- | --- | --- |
| 2,309,766 | Harroun et al. | Feb. 2, 1943 |
| 2,331,006 | Suttles | Oct. 5, 1943 |